(12) United States Patent
Held et al.

(10) Patent No.: US 8,096,128 B2
(45) Date of Patent: Jan. 17, 2012

(54) HEAT ENGINE AND HEAT TO ELECTRICITY SYSTEMS AND METHODS

(75) Inventors: Timothy J. Held, Akron, OH (US);
Stephen Hostler, Akron, OH (US);
Jason D. Miller, Hudson, OH (US);
Brian F. Hume, Westerville, OH (US)

(73) Assignee: Echogen Power Systems, Akron, OH (US)

( * ) Notice: Subject to any disclaimer, the term of this patent is extended or adjusted under 35 U.S.C. 154(b) by 269 days.

(21) Appl. No.: 12/631,379

(22) Filed: Dec. 4, 2009

(65) Prior Publication Data

US 2010/0156112 A1 Jun. 24, 2010

Related U.S. Application Data

(60) Provisional application No. 61/243,200, filed on Sep. 17, 2009.

(51) Int. Cl.
*F01K 25/02* (2006.01)
(52) U.S. Cl. .......... 60/645; 60/655; 60/660; 60/682
(58) Field of Classification Search .......... 60/643, 60/645, 655, 660, 682–683
See application file for complete search history.

(56) References Cited

U.S. PATENT DOCUMENTS

| | | | | |
|---|---|---|---|---|
| 3,277,955 A * | 10/1966 | Heller | ........................... | 165/283 |
| 3,998,058 A | 12/1976 | Park | | |
| 4,164,848 A * | 8/1979 | Gilli et al. | ........................... | 60/652 |
| 4,183,220 A * | 1/1980 | Shaw | ........................... | 60/682 |
| 4,198,827 A * | 4/1980 | Terry et al. | ........................... | 60/649 |
| 4,257,232 A | 3/1981 | Bell | | |
| 4,347,711 A * | 9/1982 | Noe et al. | ........................... | 62/160 |
| 5,392,606 A | 2/1995 | Labinov et al. | | |
| 5,444,972 A * | 8/1995 | Moore | ........................... | 60/39.182 |
| 6,282,900 B1 | 9/2001 | Bell | | |
| 6,374,630 B1 | 4/2002 | Jones | | |
| 6,446,425 B1 * | 9/2002 | Lawlor | ........................... | 60/768 |
| 6,484,490 B1 * | 11/2002 | Olsen et al. | ........................... | 60/39.281 |
| 6,644,062 B1 * | 11/2003 | Hays | ........................... | 62/402 |

(Continued)

*Primary Examiner* — Hoang Nguyen
(74) *Attorney, Agent, or Firm* — Edmonds & Nolte, PC

(57) ABSTRACT

A waste heat recovery system, method and device executes a thermodynamic cycle using a working fluid in a working fluid circuit which has a high pressure side and a low pressure side. Components of the system in the working fluid circuit include a waste heat exchanger in thermal communication with a waste heat source also connected to the working fluid circuit, whereby thermal energy is transferred from the waste heat source to the working fluid in the working fluid circuit, an expander located between the high pressure side and the low pressure side of the working fluid circuit, the expander operative to convert a pressure/enthalpy drop in the working fluid to mechanical energy, a recuperator in the working fluid circuit operative to transfer thermal energy between the high pressure side and the low pressure side of the working fluid circuit, a cooler in thermal communication with the low pressure side of the working fluid circuit operative to control temperature of the working fluid in the low side of the working fluid circuit, a pump in the working fluid circuit and connected to the low pressure side and to the high pressure side of the working fluid circuit and operative to move the working fluid through the working fluid circuit, and a mass management system connected to the working fluid circuit, the mass management system, method and device having a working fluid vessel connected to the low pressure side of the working fluid circuit and configured to passively control an amount of working fluid mass in the working fluid circuit.

19 Claims, 17 Drawing Sheets

U.S. PATENT DOCUMENTS

| | | |
|---|---|---|
| 6,751,959 B1 | 6/2004 | McClanahan et al. |
| 7,900,450 B2 * | 3/2011 | Gurin .......................... 60/641.2 |
| 2004/0083732 A1 | 5/2004 | Hanna et al. |
| 2004/0211182 A1 | 10/2004 | Gould |
| 2006/0254281 A1 | 11/2006 | Badeer et al. |
| 2007/0130952 A1 | 6/2007 | Copen |
| 2008/0066470 A1 | 3/2008 | MacKnight |
| 2008/0250789 A1 | 10/2008 | Myers et al. |
| 2009/0107144 A1 | 4/2009 | Moghtaderi et al. |
| 2009/0173337 A1 * | 7/2009 | Tamaura et al. .............. 126/634 |
| 2009/0266075 A1 | 10/2009 | Westmeier et al. |

* cited by examiner

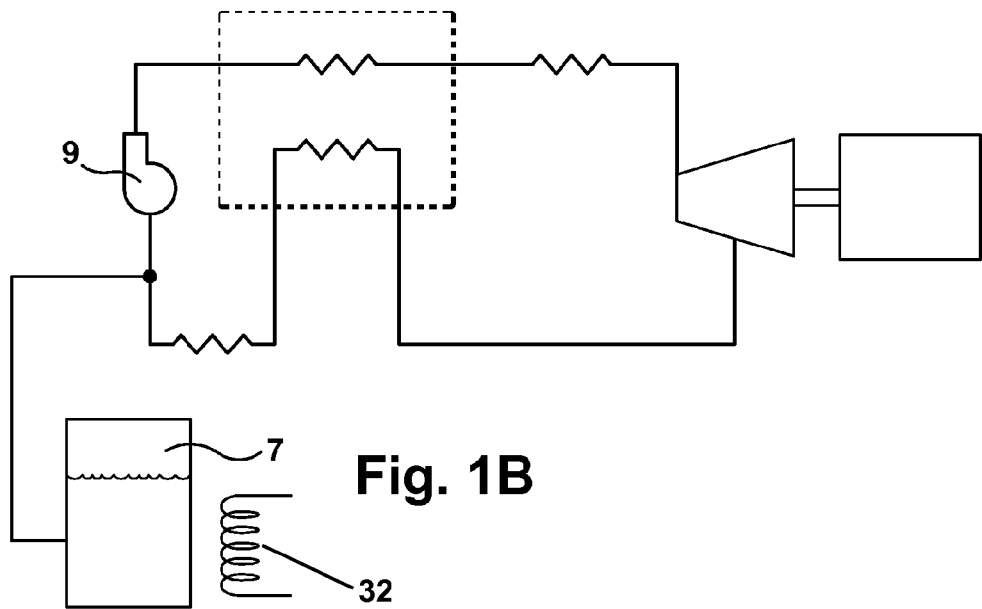
Fig. 1B
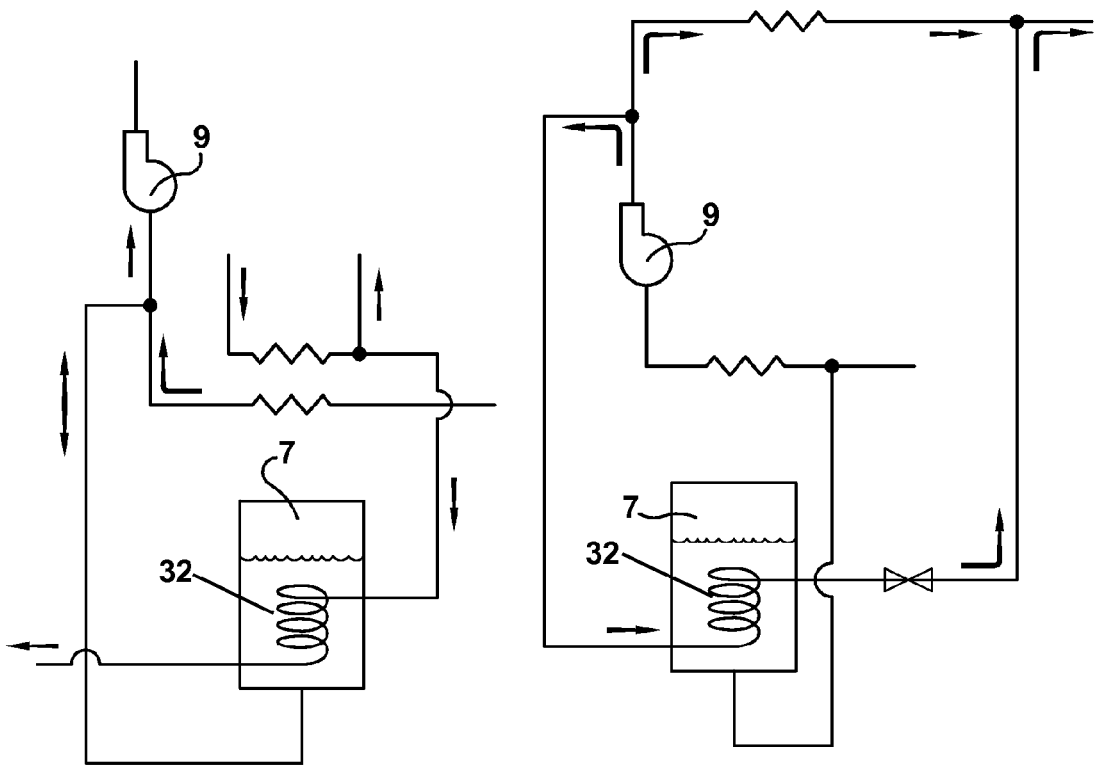
Fig. 1C     Fig. 1D

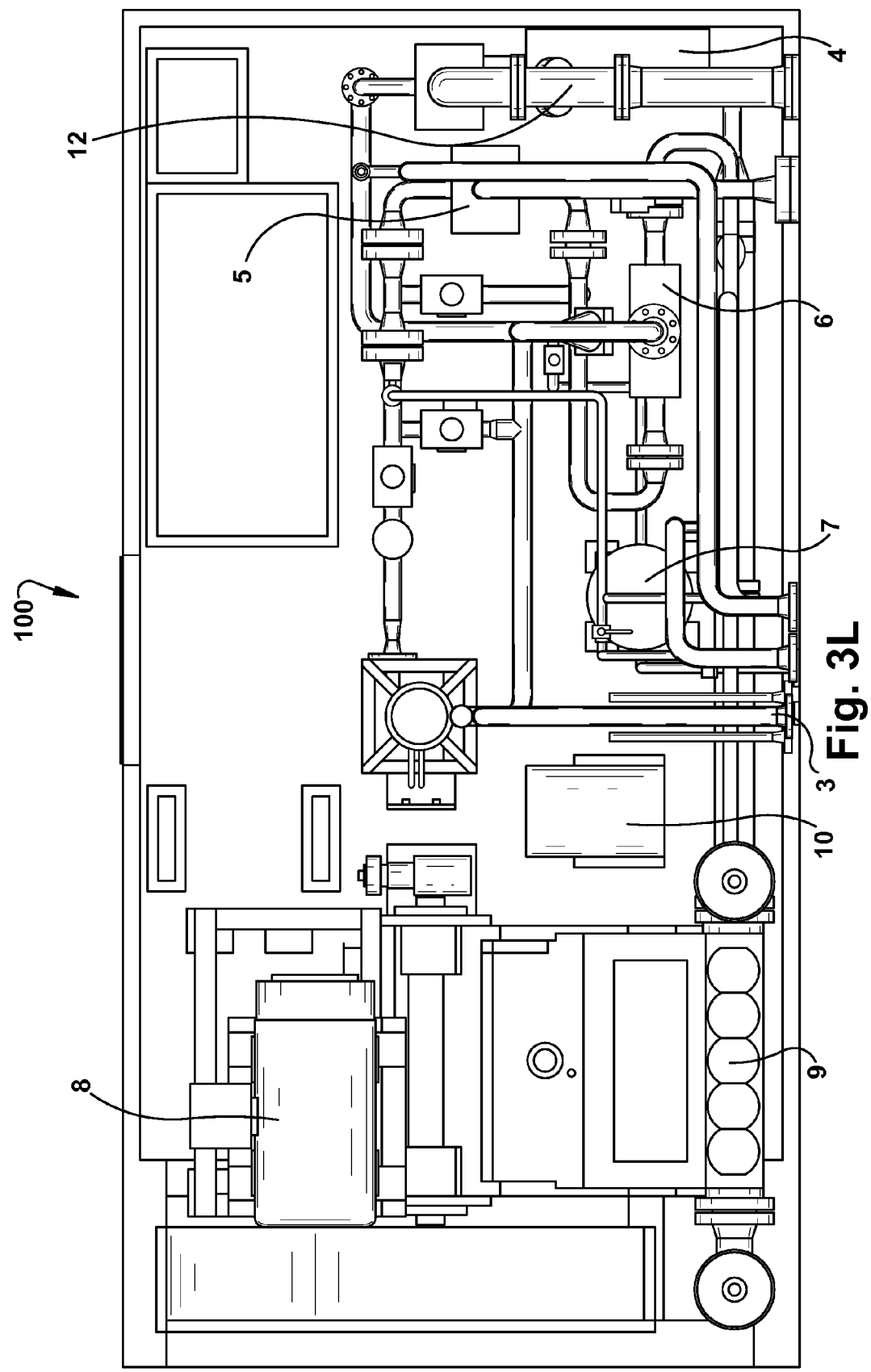

HEAT ENGINE AND HEAT TO ELECTRICITY SYSTEMS AND METHODS

RELATED APPLICATIONS

This application is a conversion of U.S. Provisional patent application No. 61/243,200, filed Sep. 17, 2009.

FIELD OF THE INVENTION

The present invention is in the field of thermodynamics and is more specifically directed to a heat engine and a related heat to electricity system that utilizes the Rankine thermodynamic cycle in combination with selected working fluids to produce power from a wide range of thermal sources.

BACKGROUND OF THE INVENTION

Heat is often created as a byproduct of industrial processes where flowing streams of liquids, solids or gasses that contain heat must be exhausted into the environment or removed in some way in an effort to maintain the operating temperatures of the industrial process equipment. Sometimes the industrial process can use heat exchanger devices to capture the heat and recycle it back into the process via other process streams. Other times it is not feasible to capture and recycle this heat because it is either too high in temperature or it may contain insufficient mass flow. This heat is referred to as "waste" heat. Waste heat is typically discharged directly into the environment or indirectly through a cooling medium, such as water.

Waste heat can be utilized by turbine generator systems which employ a well known thermodynamic method known as the Rankine cycle to convert heat into work. Typically, this method is steam-based, wherein the waste heat is used to raise steam in a boiler to drive a turbine. The steam-based Rankine cycle is not always practical because it requires heat source streams that are relatively high in temperature (600° F. or higher) or are large in overall heat content. The complexity of boiling water at multiple pressures/temperatures to capture heat at multiple temperature levels as the heat source stream is cooled, is costly in both equipment cost and operating labor. The steam-based Rankine cycle is not a realistic option for streams of small flow rate and/or low temperature.

There exists a need in the art for a system that can efficiently and effectively produce power from not only waste heat but also from a wide range of thermal sources.

SUMMARY OF THE INVENTION

A waste heat recovery system executes a thermodynamic cycle using a working fluid in a working fluid circuit which has a high pressure side and a low pressure side. Components of the system in the working fluid circuit include a waste heat exchanger in thermal communication with a waste heat source also connected to the working fluid circuit, whereby thermal energy is transferred from the waste heat source to the working fluid in the working fluid circuit, an expander located between the high pressure side and the low pressure side of the working fluid circuit, the expander operative to convert a pressure/enthalpy drop in the working fluid to mechanical energy, a recuperator in the working fluid circuit operative to transfer thermal energy between the high pressure side and the low pressure side of the working fluid circuit, a cooler in thermal communication with the low pressure side of the working fluid circuit operative to control temperature of the working fluid in the low side of the working fluid circuit, a pump in the working fluid circuit and connected to the low pressure side and to the high pressure side of the working fluid circuit and operative to move the working fluid through the working fluid circuit, and a mass management system connected to the working fluid circuit, the mass management system having a working fluid vessel connected to the low pressure side of the working fluid circuit.

In one embodiment, a waste heat energy recovery and conversion device includes a working fluid circuit having conduit and components for containing and directing flow of a working fluid between components of the device operative to convert thermal energy into mechanical energy, the working fluid circuit having a high pressure side and a low pressure side; a support structure for supporting the conduit of the working fluid circuit and the components, the components comprising: an expander operative to convert a pressure drop in the working fluid to mechanical energy, a power generator (such as for example an alternator) which is coupled to the expander, a recuperator, a cooler, a pump and a pump motor operative to power the pump; and a mass management system having a mass control tank for receiving and holding the working fluid, the mass control tank connected by conduit to the high pressure side of the working fluid circuit and to the low pressure side of the working fluid circuit. An enclosure may also be provided to substantially enclose some or all of the components of the device. One or more heat exchangers may be located on or off of the support structure. The heat exchanger(s), recuperator and cooler/condenser may include printed circuit heat exchange panels. A control system for controlling operation of the device may be remote or physically packaged with the device.

The disclosure and related inventions further includes a method of converting thermal energy into mechanical energy by use of a working fluid in a closed loop thermodynamic cycle contained in a working fluid circuit having components interconnected by conduit, the components including at least one heat exchanger operative to transfer thermal energy to the working fluid, at least one expansion device operative to convert thermal energy from the working fluid to mechanical energy, at least one pump operative to transfer working fluid through the working fluid circuit, the working fluid circuit having a high pressure side and a low pressure side, and a mass management system comprising a mass management vessel connected by conduit to the low pressure side of the working fluid circuit, the method including the steps of: placing a thermal energy source in thermal communication with a heat exchanger component; pumping the working fluid through the working fluid circuit by operation of the pump to supply working fluid in a supercritical or subcritical state to the expander; directing the working fluid away from the expander in a sub-critical state through the working fluid circuit and to the pump; controlling flow of the working fluid in a super-critical state from the high pressure side of the working fluid circuit to the mass management vessel, and controlling an amount of working fluid in a sub-critical or super-critical state from the mass management vessel to the low pressure side of the working fluid circuit and to the pump.

The disclosure and related inventions further includes a mass management system for controlling an amount of working fluid mass in a thermodynamic cycle in a working fluid circuit having a pump or a compressor, the mass management system having a working fluid control tank for holding an amount of the working fluid at a first pressure P, the working fluid control tank located outside of the working fluid circuit; and a fluid connection between the working fluid control tank and a low pressure side of the thermodynamic cycle in the working fluid circuit to allow passage of the working fluid between the working fluid circuit and the working fluid control tank.

These and other aspects of the disclosure and related inventions are further described below in representative forms with reference to the accompanying drawings.

DESCRIPTION OF THE DRAWINGS

FIGS. 1B-1D illustrate various conduit arrangements and working fluid flow directions in the working fluid circuit;

FIGS. 3A-3M are schematic drawings of a representative embodiment of a heat engine device and heat engine skid of the present disclosure and related inventions;

DETAILED DESCRIPTION OF PREFERRED AND ALTERNATE EMBODIMENTS

The inventive heat engine 100 (also referred to herein in the alternative as a "thermal engine", "power generation device", "waste heat recovery system" and "heat recovery system", "heat to electricity system") of the present disclosure utilizes a thermodynamic cycle which has elements of the Rankine thermodynamic cycle in combination with selected working fluid(s), such as carbon dioxide, to produce power from a wide range of thermal sources. By "thermal engine" or "heat engine" what is generally referred to is the equipment set that executes the thermodynamic cycle described herein; by "heat recovery system" what is generally referred to is the thermal engine in cooperation with other equipment to deliver heat (from any source) to and remove heat from the inventive thermal engine.

The thermodynamic cycle executed by the heat engine 100 is described with reference to a pressure-enthalpy diagram for a selected working fluid, FIG. 2. The thermodynamic cycle is designed to operate as a closed loop thermodynamic cycle in a working fluid circuit having a flow path defined by conduit which interconnects components of the working fluid circuit. The thermal engine which operates the cycle may or may not be hermetically or otherwise entirely sealed (such that no amount of working fluid is leaked from the system into the surrounding environment).

Figure 2:
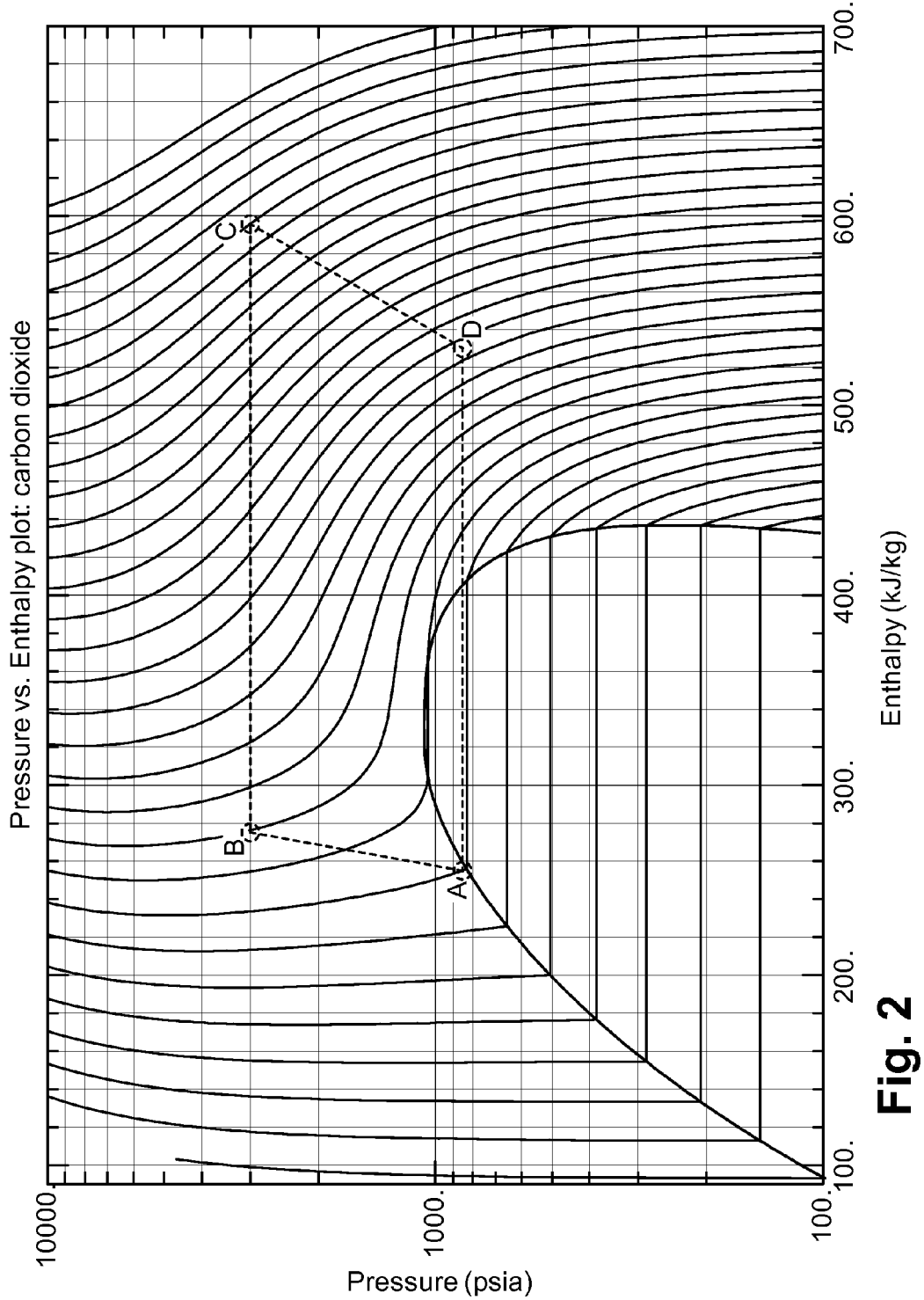
FIG. 2 is a pressure-enthalpy diagram for carbon dioxide.

The thermodynamic cycle that is executed by the thermal engine is shown in its most rudimentary form in FIG. 2 which is a pressure-enthalpy diagram for carbon dioxide. The thermodynamic cycle may be described for ease of understanding by referencing a working fluid at point A on this diagram. At this point, the working fluid has its lowest pressure and lowest enthalpy relative to its state at any other point during the cycle and as shown on the diagram. From there, the working fluid is compressed and/or pumped to a higher pressure (point B on the diagram). From there, thermal energy is introduced to the working fluid which both increases the temperature of the working fluid and increases the enthalpy of the working fluid (point C on the diagram). The working fluid is then expanded through a mechanical process to point (D). From there, the working fluid discharges heat, dropping in both temperature and enthalpy, until it returns to point (A). Each process (i.e., A-B, B-C, C-D, D-A) need not occur as shown on the exemplary diagram and one of ordinary skill in the art would recognize that each step of the cycle could be achieved in a variety of ways and/or that it is possible to achieve a variety of different coordinates on the diagram. Similarly, each point on the diagram may vary dynamically over time as variables within and external to the system change, i.e., ambient temperature, waste heat temperature, amount of mass in the system.

In the preferred embodiment of the thermal engine, the cycle is executed during normal, steady state operation such that the low pressure side of the system (points A and D on FIG. 2) is between 400 psia and 1500 psia and the high pressure side of the system is between 2500 psia and 4500 psia (points B and C FIG. 2). One of ordinary skill in the art would recognize that either or both higher or lower pressures could be selected for each or all points. In the preferred embodiment of the cycle, it will be observed that between points C and D, the working fluid transitions from a supercritical state to a subcritical state (i.e., a transcritical cycle); one of ordinary skill in the art would recognize that the pressures at points C and D could be selected such that the working fluid remained in a supercritical state during the entire cycle.

In a preferred embodiment of the thermal engine, the working fluid is carbon dioxide. The use of the term carbon dioxide is not intended to be limited to carbon dioxide of any particular type, purity or grade of carbon dioxide although industrial grade carbon dioxide is the preferred working fluid. Carbon dioxide is a greenhouse friendly and neutral working fluid that offers benefits such as non-toxicity, non-flammability, easy availability, low price, and no need of recycling.

In the preferred embodiment, the working fluid is in a supercritical state over certain portions of the system (the "high pressure side"), and in a subcritical state at other portions of the system (the "low pressure side"). In other embodiments, the entire cycle may be operated such that the working fluid is in a supercritical or subcritical state during the entire execution of the cycle.

In various embodiments, the working fluid may a binary, ternary or other working fluid blend. The working fluid combination would be selected for the unique attributes possessed by the fluid combination within a heat recovery system as described herein. For example, one such fluid combination is comprised of a liquid absorbent and carbon dioxide enabling the combined fluid to be pumped in a liquid state to high pressure with less energy input than required to compress $CO_2$. In another embodiment, the working fluid may be a combination of carbon dioxide and one or more other miscible fluids. In other embodiments, the working fluid may be a combination of carbon dioxide and propane, or carbon dioxide and ammonia.

One of ordinary skill in the art would recognize that using the term "working fluid" is not intended to limit the state or phase of matter that the working fluid is in. In other words, the working fluid may be in a fluid phase, a gas phase, a supercritical phase, a subcritical state or any other phase or state at any one or more points within the cycle.

Figure 1A:
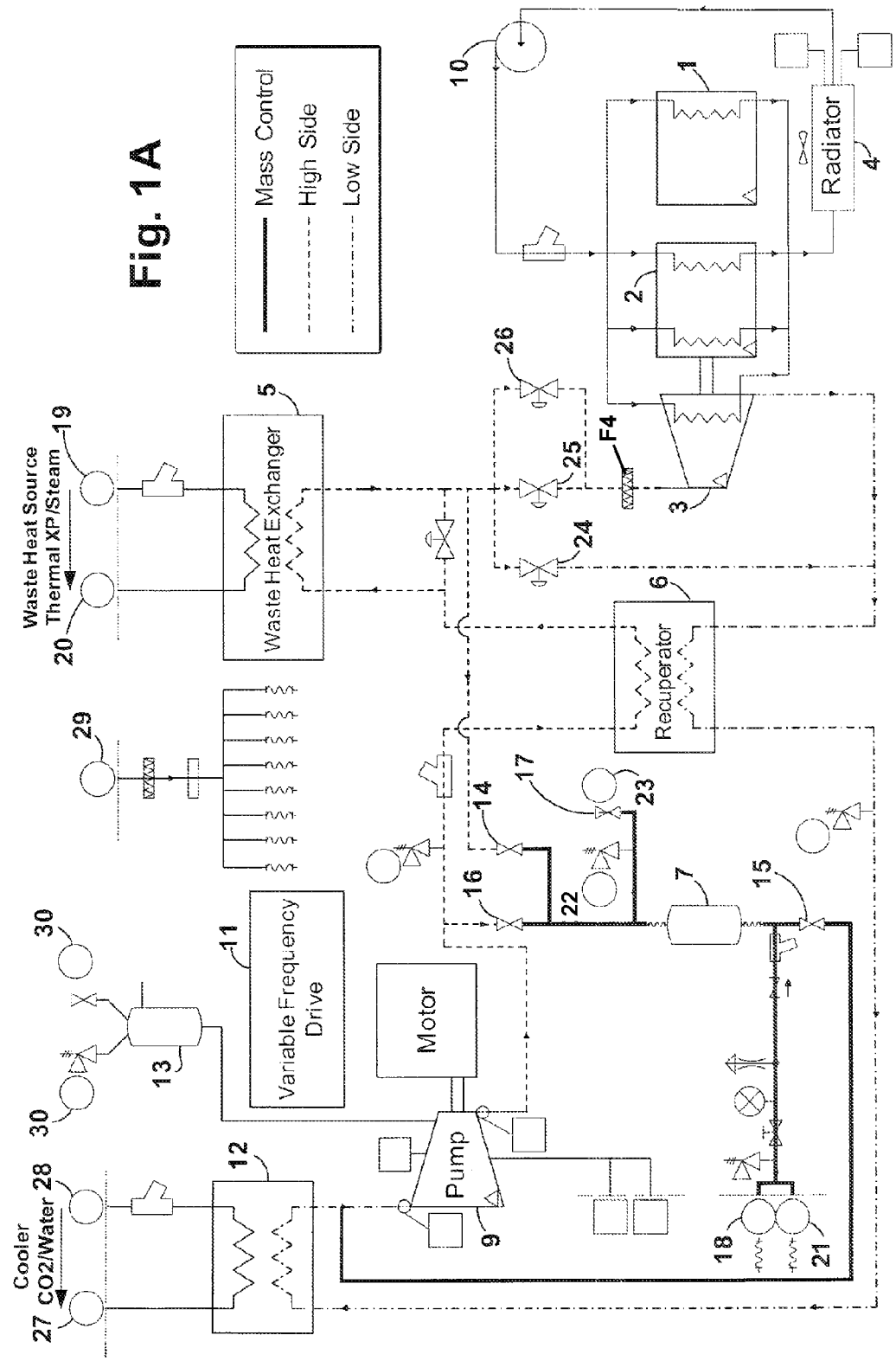
FIG. 1A is a schematic diagram of the heat to electricity system of the present invention.

The inventive heat to electricity system may utilize other fluids in other parts of the system, such as water, thermal oils or suitable refrigerants; these other fluids may be used within heat exchangers and equipment external to the heat engine 100 (such as at the Cooler 12 and/or Waste Heat Exchanger 5 shown in FIG. 1A) and within cooling or other cycles and subsystems that operate within the heat to electricity system (for example at the Radiator 4 cooling loop provided at the alternator 2 of the thermal engine shown in FIG. 1A).

As further described, in one representative embodiment, a 250 kW (net) or greater skid-based system, as illustrated conceptually in FIGS. 3A-3M, is provided for deployment at any source or site of waste or by-product heat. Nominal rated output (electrical or work) is not intended to be a limiting feature of the disclosure or related inventions.

The heat engine 100 of the disclosure has three primary classes of equipment through which the working fluid may be circulated as the thermodynamic cycle is executed, (i) one or more heat exchangers (ii) one or more pumps and/or compressors and (iii) one or more expansion (work) devices (such as a turbine, a ramjet, or a positive displacement expander 3 such as a geroler or gerotor). Each of these pieces of equipment is operatively coupled in the cycle as shown on FIG. 1A through the use of suitable conduits, couplings and fittings, for example in a working fluid circuit, as further described.

The heat engine 100 may also include a means for converting mechanical energy from the one or more expansion devices into electricity; such means may include but are not limited to a generator, alternator 2, or other device(s) and related power conditioning or conversion equipment or devices.

In one embodiment, certain components of the heat engine 100 may share common elements such as in the case of a turboalternator (shown on FIG. 1A) (where an expansion device shares a common shaft with an alternator 2) or in the case of a turbopump, where an expansion device shares a common shaft with a pump. Alternatively, the expansion device may be mechanically coupled to the electrical generating means (i) by magnetically coupling the turbine shaft to the rotor of the electrical generating means and/or (ii) by a gearbox operatively coupling the turbine shaft and the rotor of the electrical generating means.

The heat engine 100 may also include other equipment and instruments such as sensors, valves (which may be on/off or variable), fittings, filters, motors, vents, pressure relief equipment, strainers, suitable conduit, and other equipment and sensors. The preferred heat engine 100 includes the additional equipment shown on FIG. 1A.

The preferred heat engine 100 also includes a system for managing the amount of working fluid within the system such as the mass management system disclosed on FIG. 1A, as further described.

The preferred heat engine 100 also includes a control system and related equipment allowing for the automated and/or semi-automated operation of the engine, the remote control of the system and/or the monitoring of system performance.

The preferred heat engine 100 also includes one or more cooling cycle systems to remove heat from and/or provide thermal management to one or more of the expansion device, the electrical producing means and/or the power electronics 1. In the preferred embodiment, there is provided a cooling cycle shown on FIG. 1A that removes heat from and provides thermal management to the mechanical coupling between the expander 3 and the alternator 2, the alternator 2, and the power electronics 1.

The system of the current invention is flexible and may utilize many different types of conventional heat exchangers. The preferred embodiment of the inventive heat engine system 100 utilizes one or more printed circuit heat exchangers (PCHE) or other construction of the heat exchanger, recuperator or cooler components, each of which may contain one or more cores where each core utilizes microchannel technology.

As used herein and known in the art, "microchannel technology" includes, but is not limited to, heat exchangers that contain one or more microchannels, mesochannels, and/or minichannels. As used herein the terms "microchannels," "mesochannels," and/or "minichannels" are utilized interchangeably. Additionally, the microchannels, mesochannels, and/or minichannels of the present invention are not limited to any one particular size, width and/or length. Any suitable size, width or length can be utilized depending upon a variety of factors. Furthermore, any orientation of the microchannels, mesochannels, and/or minichannels can be utilized in conjunction with the various embodiments of the present invention.

The expansion device (also referred to herein as an "expander") may be a valve or it may be a device capable of transforming high temperature and pressure fluid into mechanical energy. The expansion device may have an axial or radial construction; it may be single or multi-staged. Examples include a geroler, a gerotor, other types of positive displacement devices such as a pressure swing, a turbine, or any other device capable of transforming a pressure or pressure/enthalpy drop in a working fluid into mechanical energy.

In a preferred embodiment, the device 3 is a turboalternator wherein the turbine is operatively coupled to the alternator 2 by either (i) sharing a single shaft (the "single shaft design") or by operatively coupling the turbine shaft to the alternator 2 rotor (or other shaft) by using high powered magnets to cause two shafts to operate as a single shaft. In the preferred embodiment, the turbine is physically isolated from the alternator 2 in order to minimize windage losses within the alternator 2. Thus, in the preferred embodiment, while the turbine is operatively coupled to the alternator 2, the turbine and alternator 2 do not share a common housing (or casing). In the single shaft design, the turbine casing is sealed at the common shaft and thereby isolated from the alternator 2 through the use of suitable shaft seals. In the single shaft design, suitable shaft seals may be any of the following, labyrinth seal, a double seal, a dynamically pressure balanced seal (sometimes called a floating ring or fluid filled seal), a dry gas seal or any other sealing mechanism. In the magnetic coupling design, no shaft seals are required because it is possible to entirely encase the turbine within its housing thereby achieving the desired isolation from the alternator 2.

Among other differentiating attributes of the preferred turboalternator are its single axis design, its ability to deliver high isentropic efficiency (>70%), that it operates at high rotational speeds (>20K rpm), that its bearings are either not lubricated during operation or lubricated during operation only by the working fluid, and its capability of directly coupling a high speed turbine and alternator 2 for optimized system (turboalternator) efficiency. In the preferred embodiment, the turboalternator uses air-foil bearings; air foil bearings are selected as the preferred design due because they reduce or eliminate secondary systems and eliminate the requirement for lubrication (which is particularly important when working with the preferred working fluid, carbon dioxide). However, hydrostatic bearings, aerostatic bearings, magnetic bearings and other bearing types may be used.

The heat engine 100 also provides for the delivery of a portion of the working fluid into the expander 3 chamber (or housing) for purposes of cooling one or more parts of the expander 3. In a preferred embodiment, due to the potential need for dynamic pressure balancing within the preferred heat engine's turboalternator, the selection of the site within the thermal engine from which to obtain this portion of the working fluid is critical because introduction of the portion of the working fluid into the turboalternator must not disturb the pressure balance (and thus stability) of the turboalternator during operation. This is achieved by matching the pressure of the working fluid delivered into the turboalternator for purposes of cooling with the pressure of the working fluid at the inlet of the turbine; in the preferred heat engine 100, this portion of the working fluid is obtained after the working fluid passes a valve 25 and a filter F4. The working fluid is then conditioned to be at the desired temperature and pressure prior to being introduced into the turboalternator housing. This portion of the working fluid exits the turboalternator at the turboalternator outlet. A variety of turboalternator designs are capable of working within the inventive system and to achieve different performance characteristics.

The device for increasing the pressure of the working fluid from point A-B on FIG. 2 may be a compressor, pump, a ramjet type device or other equipment capable of increasing the pressure of the selected working fluid. In a preferred embodiment, the device is a pump 9, as depicted in FIGS. 1A-1D. The pump 9 may be a positive displacement pump, a centrifugal pump or any other type or construction of pump.

The pump 9 may be coupled to a VFD (variable frequency drive) 11 to control speed which in turn can be used to control the mass flow rate of the working fluid in the system, and as a consequence of this control the high side system pressure. The VFD may be in communication with a control system, as further described.

In another embodiment of the inventive thermal engine, the pump 9 may be constructed such that there is a common shaft (not shown) connecting it with an expansion device enabling the pump to be driven by the mechanical energy generated by expansion of the working fluid (e.g., a turbopump). A turbopump may be employed in place of or to supplement the pump of the preferred embodiment. As noted in the section above detailing the turboalternator, the "common shaft" may be achieved by using a magnetic coupling between the expansion device's shaft and the pump shaft. In one embodiment of the heat engine 100 with a turbopump, there is provided a secondary expansion device that is coupled to the pump by a common shaft. The secondary expansion device is located within a stream of fluid which runs parallel to the stream to the primary system expander 3 and there are two valves on either side of the secondary expander to regulate flow to the second expander. It should be noted that there need not be a second expander in order to form a turbopump. The common shaft of the turbopump may be shared with the common shaft of the primary system expander 3 and/or, in a preferred embodiment, the common shaft of the turboalternator. Similarly, if the system uses a secondary expansion device to share a common shaft with the turbopump, the secondary expansion device need not be located as described above.

The electrical producing means of one embodiment of the thermal engine is a high speed alternator 2 that is operatively coupled to the turbine to form a turboalternator (as described above). The electrical producing means may alternatively be any known means of converting mechanical energy into electricity including a generator or alternator 2. It may be operatively coupled to the primary system expander 3 by a gear box, by sharing a common shaft, or by any other mechanical connection.

The electrical producing means is operatively connected to power electronics 1 equipment set. In the preferred embodiment, the electrical output of the alternator 2 is mated with a high efficiency power electronics 1 equipment set that has equipment to provide active load adjustment capability (0-100%). In the preferred embodiment, the power electronics 1 system has equipment to provide the capability to convert high frequency, high voltage power to grid-tie quality power at appropriate conditions with low total harmonic distortion (THD), SAG support, current and voltage following, VAR compensation, for providing torque to start the turboalternator, and dynamic braking capability for versatile and safe control of the turboalternator in the event of load loss; it has also capability of synchronizing and exporting power to the grid for a wide voltage and speed range of the alternator 2.

In the preferred embodiment, the pump 9 inlet pressure has a direct influence on the overall system efficiency and the amount of power that can be generated. Because of the thermo-physical properties of the preferred working fluid, carbon dioxide, as the pump 9 inlet temperature rises and falls the system must control the inlet pressure over wide ranges of inlet pressure and temperature (for example, from −4 deg F. to 104 deg F.; and 479 psia to 1334 psia). In addition, if the inlet pressure is not carefully controlled, pump 9 cavitation is possible.

A mass management system is provided to control the inlet pressure at the pump 9 by adding and removing mass from the system, and this in turn makes the system more efficient. In the preferred embodiment, the mass management system operates with the system semi-passively. The system uses sensors to monitor pressures and temperatures within the high pressure side (from pump 9 outlet to expander 3 inlet) and low pressure side (from expander 3 outlet to pump 9 inlet) of the system. The mass management system may also include valves, tank heaters or other equipment to facilitate the movement of the working fluid into and out of the system and a mass control tank 7 for storage of working fluid.

As shown on FIG. 1A, in the case of the preferred embodiment, the mass management system includes the equipment operatively connected by the bolded lines or conduits of the diagram and at (and including) equipment at the termination points of the mass control system (e.g., 14, 15, 16, 17, 18, 21, 22, and 23). The preferred mass management system removes higher pressure, denser working fluid (relative to the pressure, temperature, and density on the low pressure side of the system) from the thermodynamic cycle being executed by the thermal engine via valve 16. The mass management system dispenses working fluid into the main heat engine system 100 via valves 14 and 15. By controlling the operation of the valves 14, 15 and 16, the mass management system adds or removes mass from the system without a pump, reducing system cost, complexity and maintenance.

As further shown in FIGS. 1B-1D, the Mass Control Tank 7 is filled with working fluid. It is in fluid communication with valves 14 and 16 such that opening either or both valves 14,16 will deliver working fluid to the top of the Mass Control Tank 7. The Mass Control Tank 7 is in fluid communication with valve 15 such that opening valve 15 will remove working fluid from the bottom of the Mass Control Tank 7. The working fluid contained within the Mass Control Tank 7 will stratify with the higher density working fluid at the bottom of the tank and the lower density working fluid at the top of the tank. The working fluid may be in liquid phase, vapor phase or both; if the working fluid is in both vapor phase and liquid phase, there will be a phase boundary separating one phase of working fluid from the other with the denser working fluid at the bottom of the Mass Control Tank 7. In this way, valve 15 will also deliver to the system the densest working fluid within the Mass Control Tank 7.

In the case of the preferred embodiment, this equipment set is combined with a set of sensors within the main heat engine system 100 and a control system as described within.

In the case of the preferred embodiment, this mass management system also includes equipment used in a variety of operating conditions such as start up, charging, shut-down and venting the heat engine system 100 as shown on FIG. 1A.

Exemplary operation of the preferred embodiment of the mass management system follows. When the working fluid in the mass control tank 7 is at vapor pressure for a given ambient temperature, and the low side pressure in the system is above the vapor pressure, the pressure in the mass control tank 7 must be increased, to allow for the addition of mass into the system. This can be controlled by opening the valve 14 and thereby allowing higher pressure, higher temperature, lower density supercritical working fluid to flow into the mass control tank 7. Valve 15 is opened to allow higher density liquid working fluid at the bottom of the mass control tank 7 to flow into the system and increase pump 9 suction pressure.

The working fluid may be in liquid phase, vapor phase or both. If the working fluid is in both vapor phase and liquid phase, there will be a phase boundary in the mass control tank 7. In general, the mass control tank 7 will contain either a mixture of liquid and vapor phase working fluid, or a mass of supercritical fluid. In the former case, there will be a phase boundary. In the latter case, there will not be a phase boundary (because one does not exist for supercritical fluids). The fluid will still tend to stratify however, and the valve 15 can be opened to allow higher density liquid working fluid at the bottom of the mass control tank 7 to flow into the system and increase pump suction pressure. Working fluid mass may be added to or removed from the working fluid circuit via the mass control tank 7.

The mass management system of the disclosure may be coupled to a control system such that the control of the various valves and other equipment is automated or semi-automated and reacts to system performance data obtained via sensors located throughout the system, and to ambient and environmental conditions.

As shown in FIGS. 1B-1D, other configurations for controlling pressure and/or temperature (or both) in the mass control tank 7 in order to move mass in and out of the system (i.e., the working fluid circuit), include the use of a heater and/or a coil 32 within the vessel/tank 7 or any other means to add or remove heat from the fluid/vapor within the mass control tank 7. Alternatively, mechanical means, such as providing pump may be used to get working fluid from the mass control tank 7 into the system.

One method of controlling the pressure of the working fluid in the low side of the working fluid circuit is by control of the temperature of the working fluid vessel or mass control tank 7. A basic requirement is to maintain the pump 9 inlet pressure above the boiling pressure at the pump 9 inlet. This is accomplished by maintaining the temperature of the mass control tank 7 at a higher level than the pump 9 inlet temperature. Exemplary methods of temperature control of the mass control tank 7 are: direct electric heat; a heat exchanger coil 32 with pump 9 discharge fluid (which is at a higher temperature than at the pump 9 inlet), or a heat exchanger coil 32 with spent cooling water from the cooler/condenser (also at a temperature higher than at the pump 9 inlet).

Figure 3A:
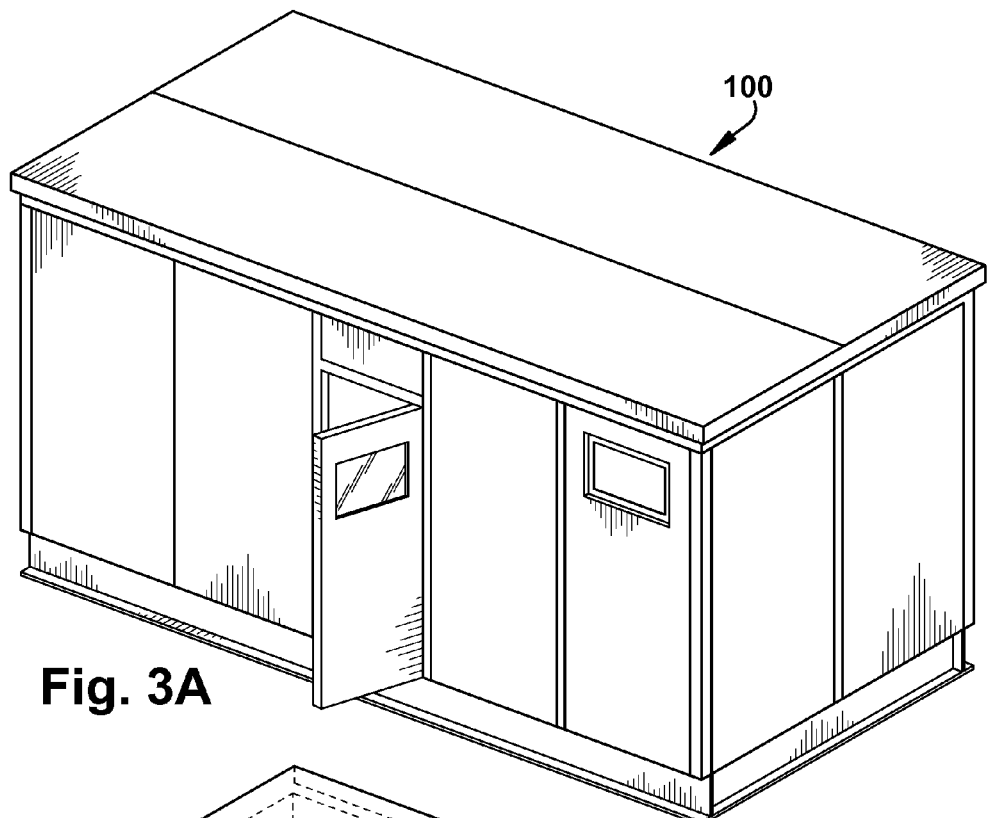
Figure 3B:
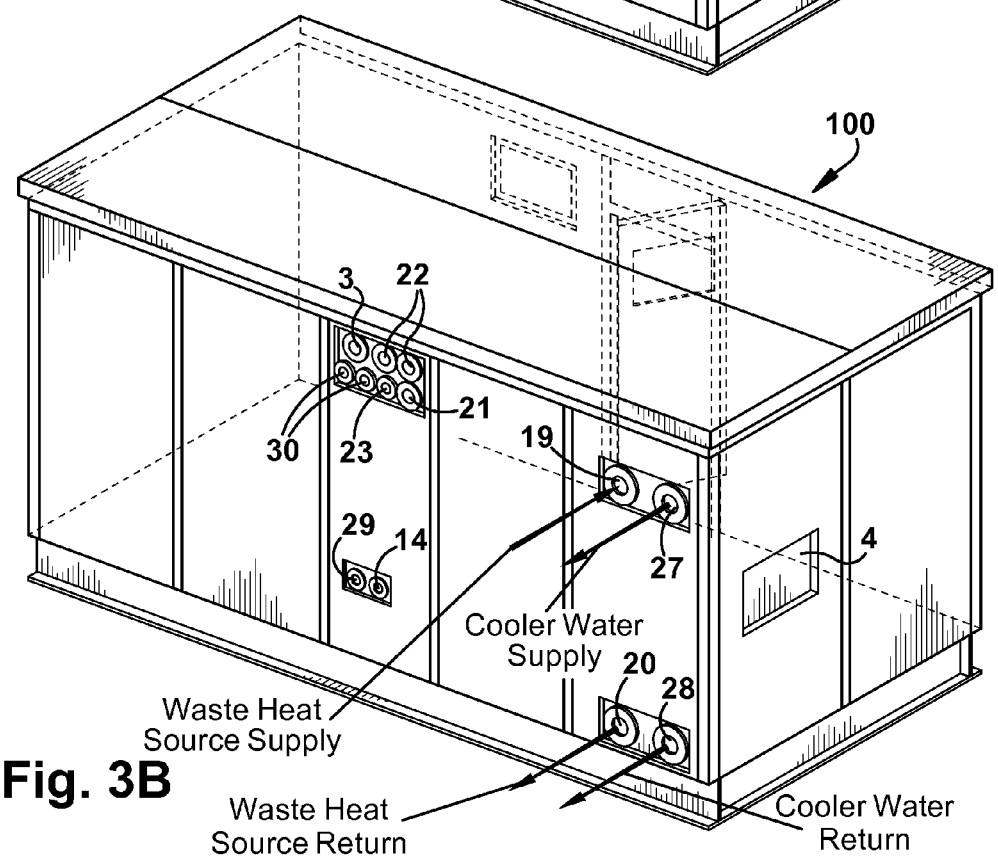
Figure 3C:
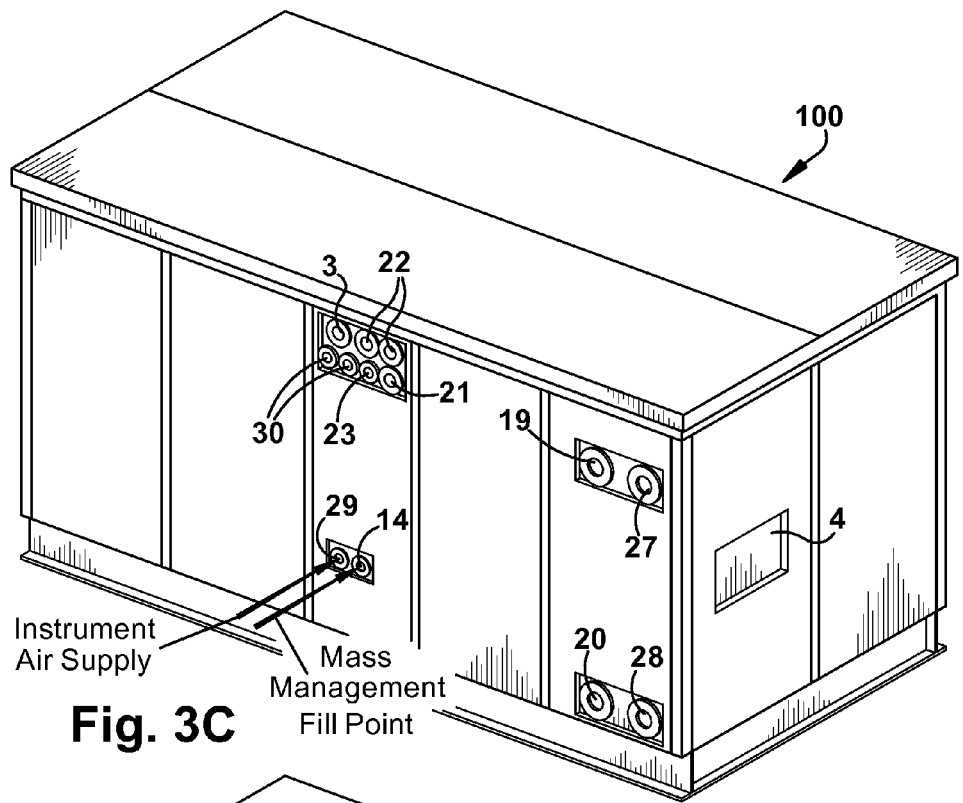
Figure 3D:
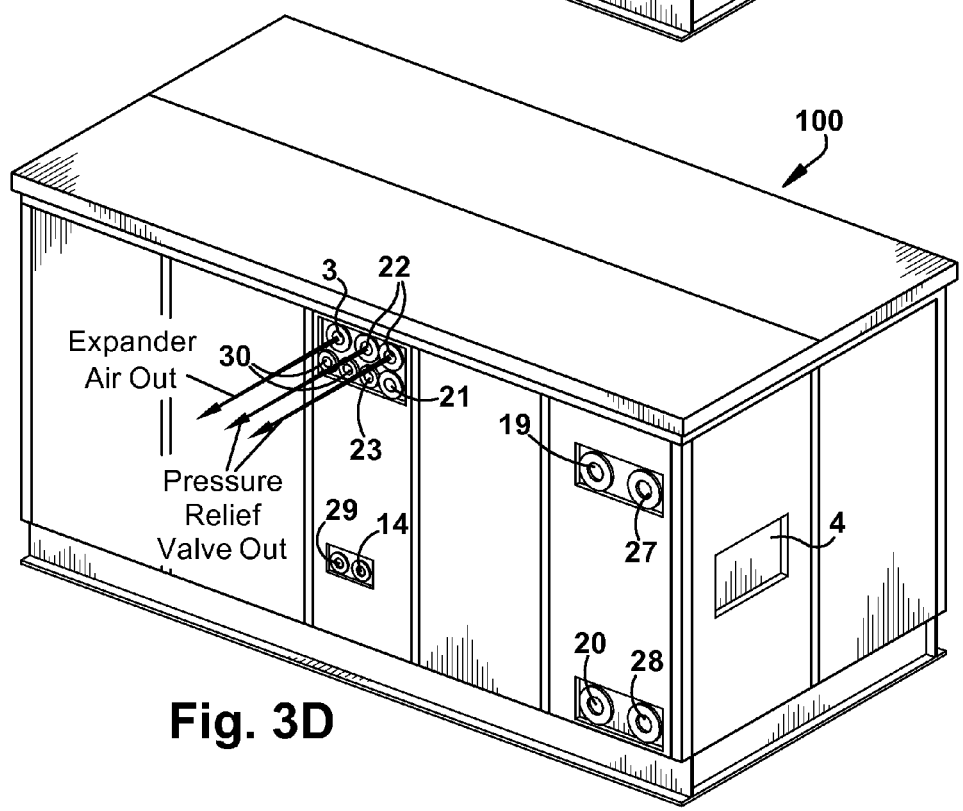
Figure 3E:
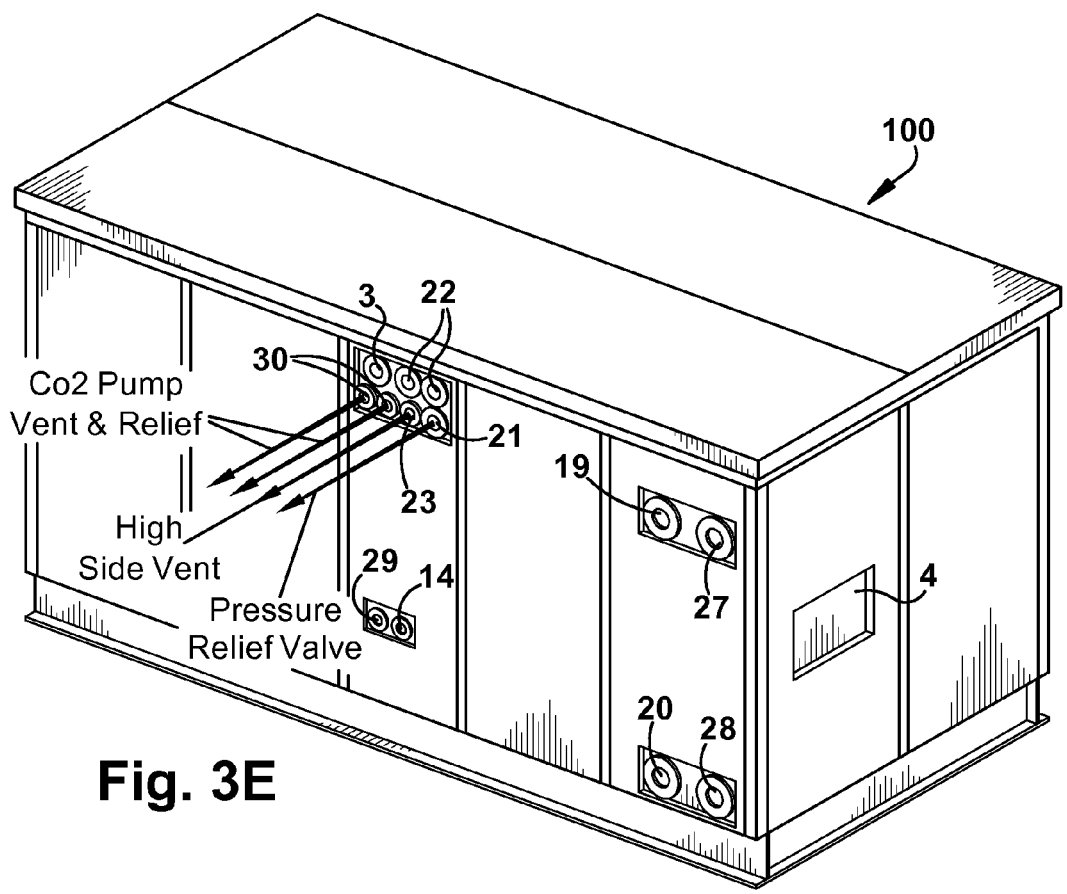
Figure 3F:
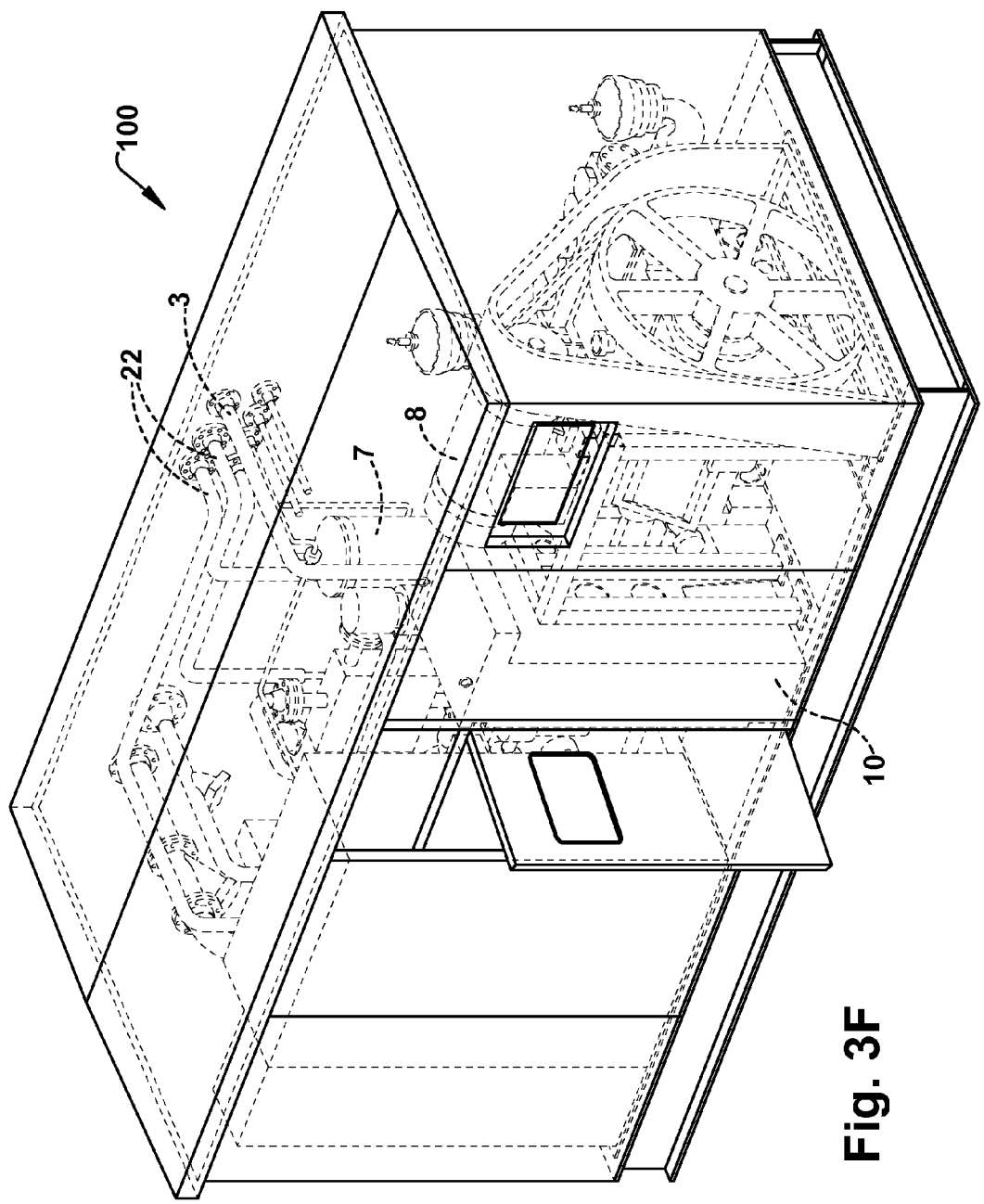
Figure 3G:
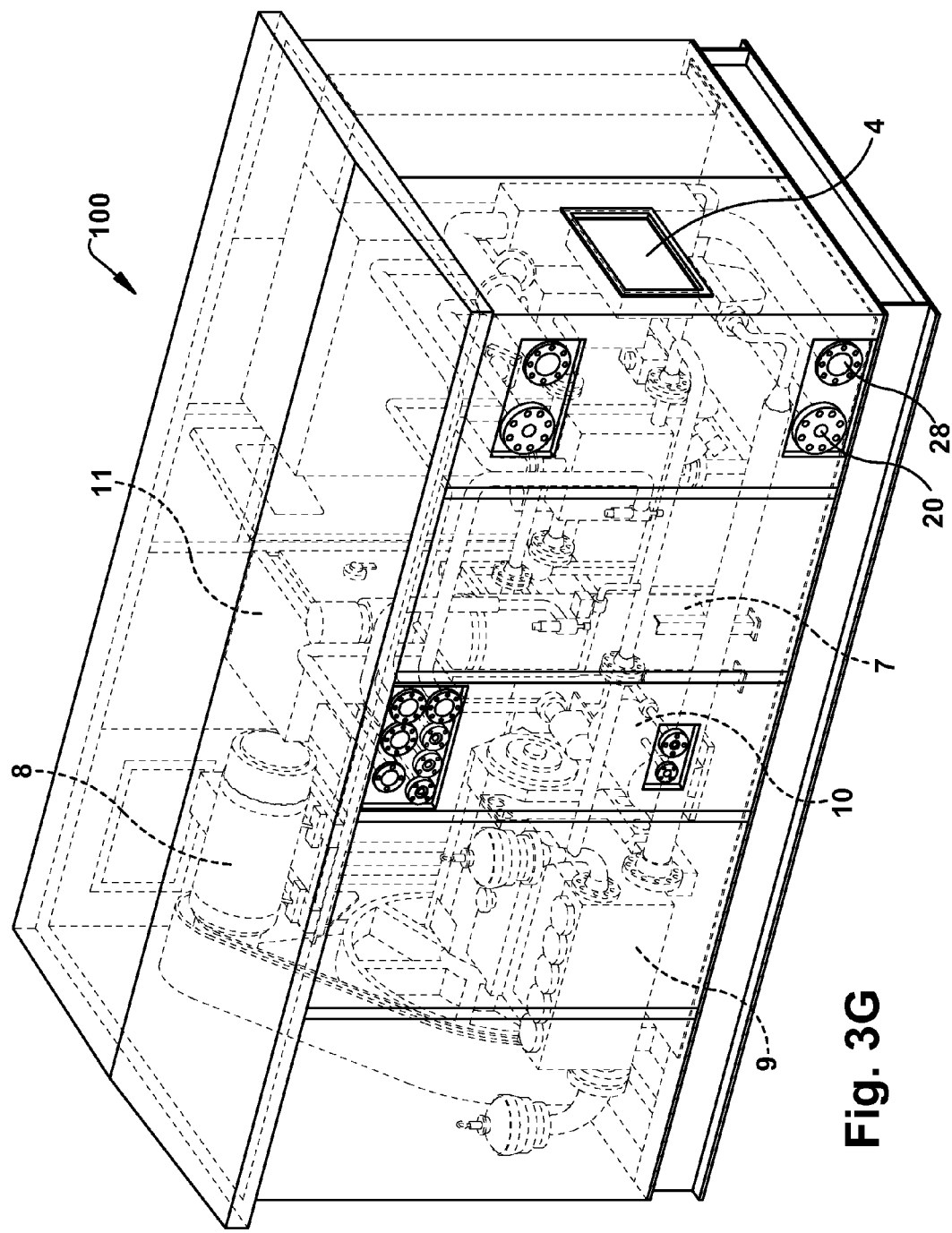
Figure 3H:
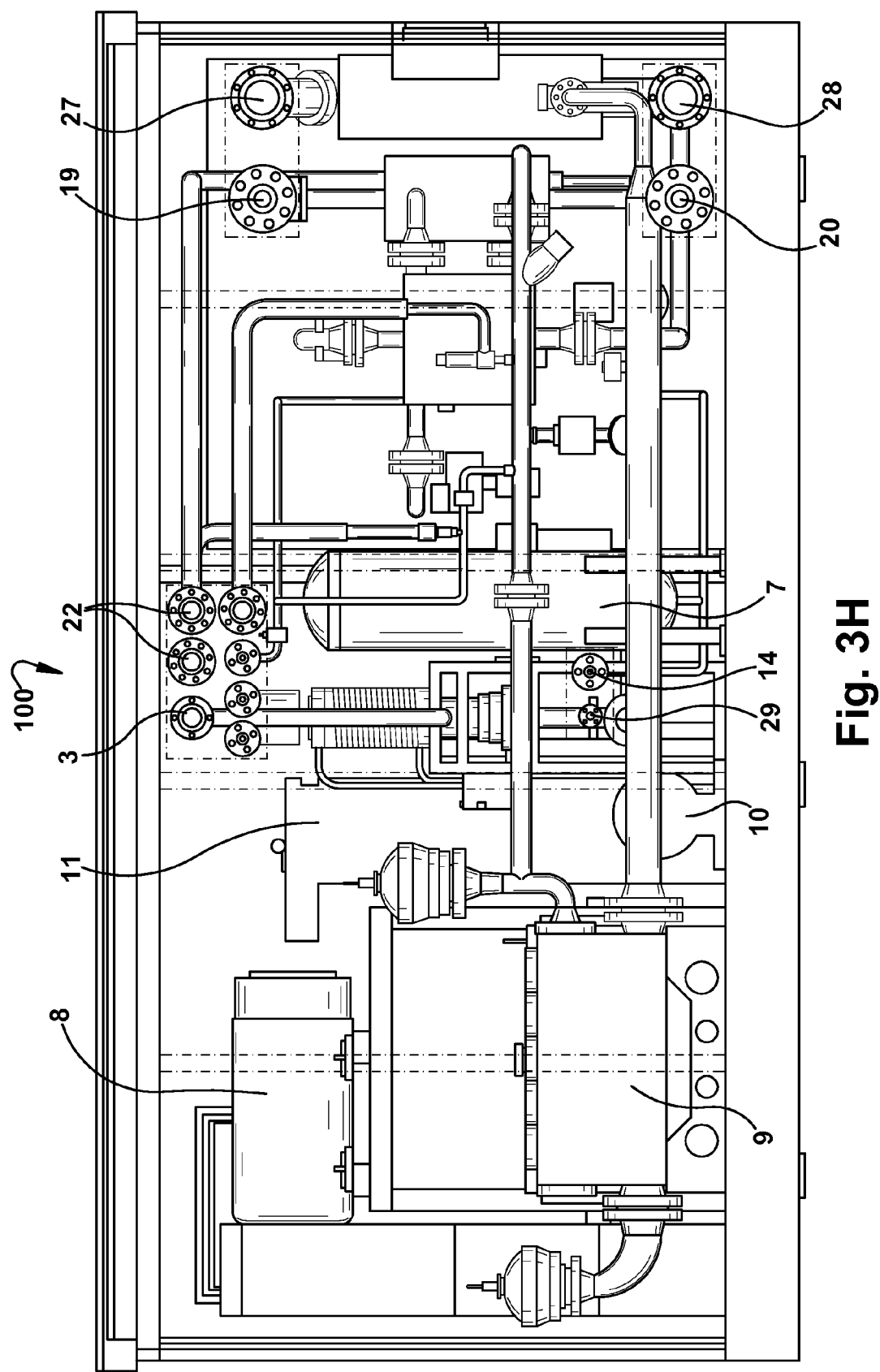
Figure 3I:
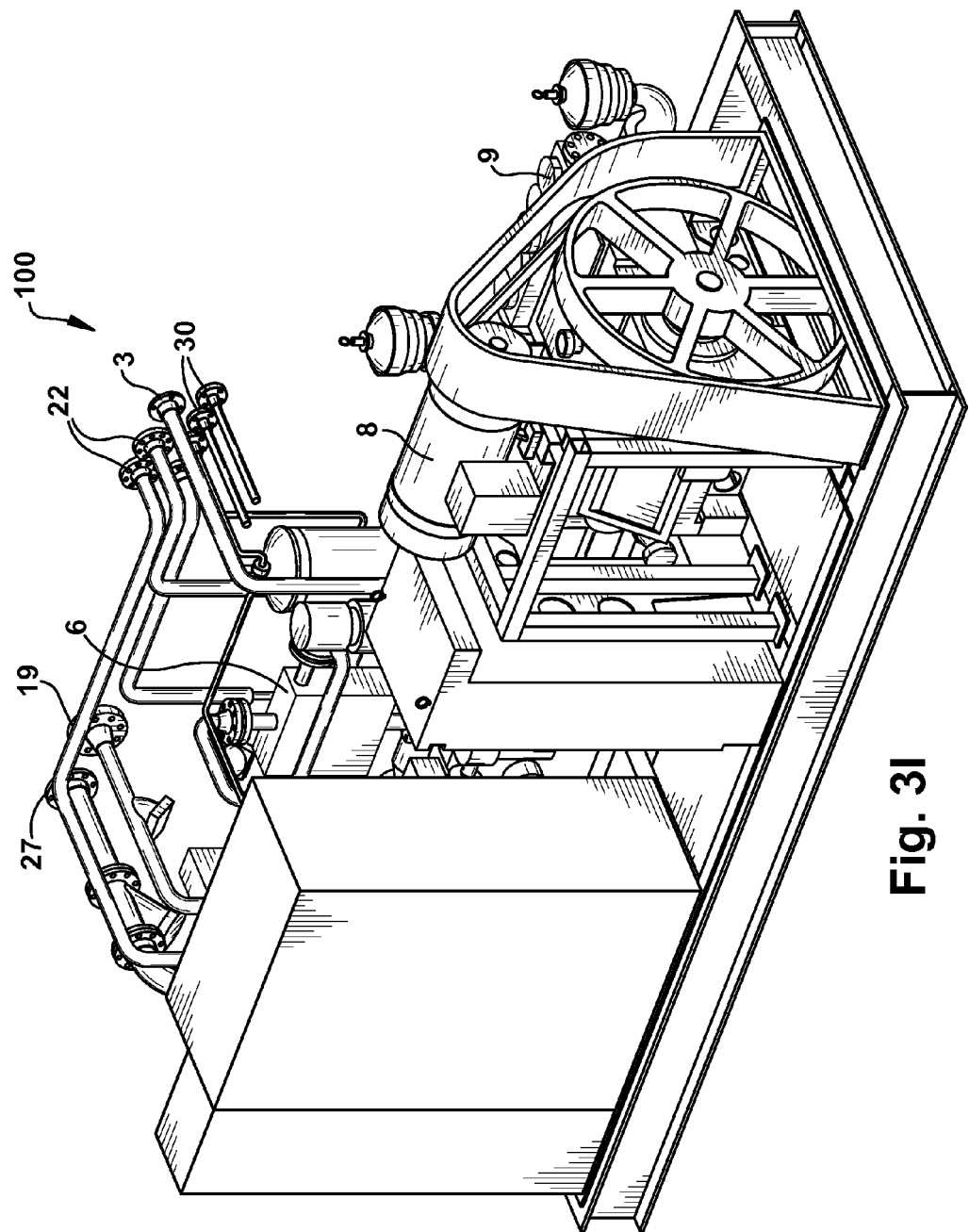
Figure 3J:
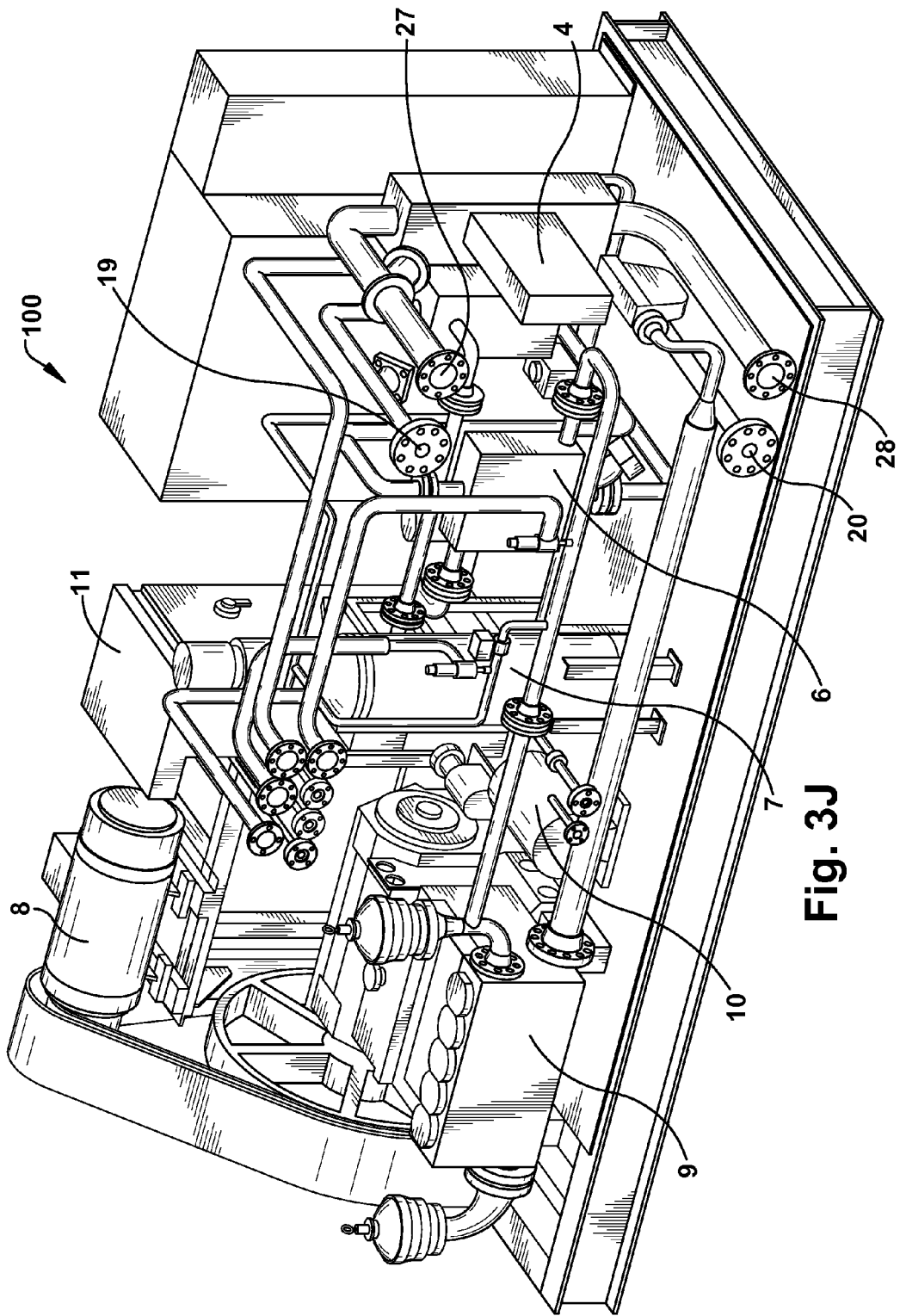
Figure 3K:
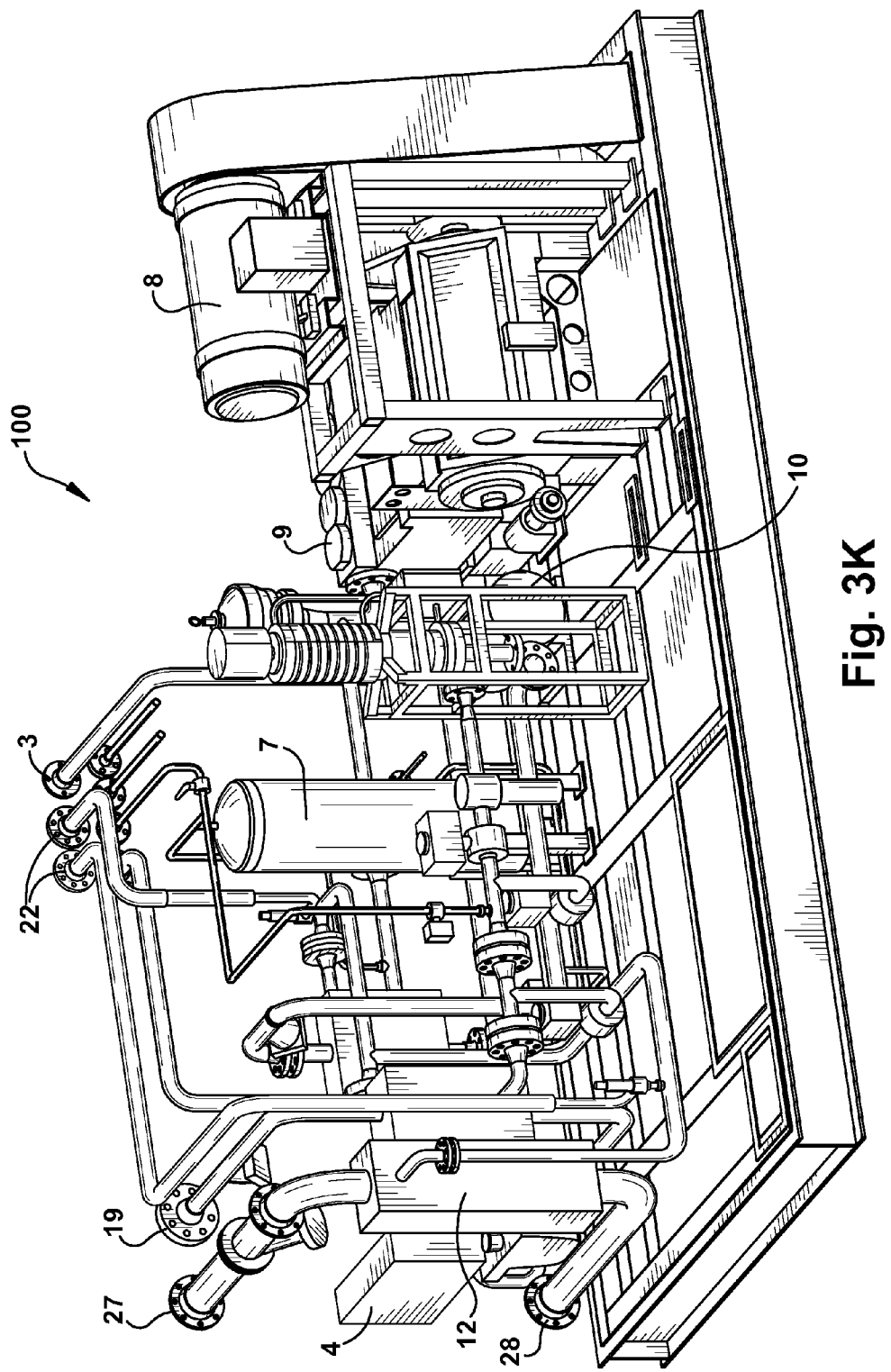
Figure 3M:
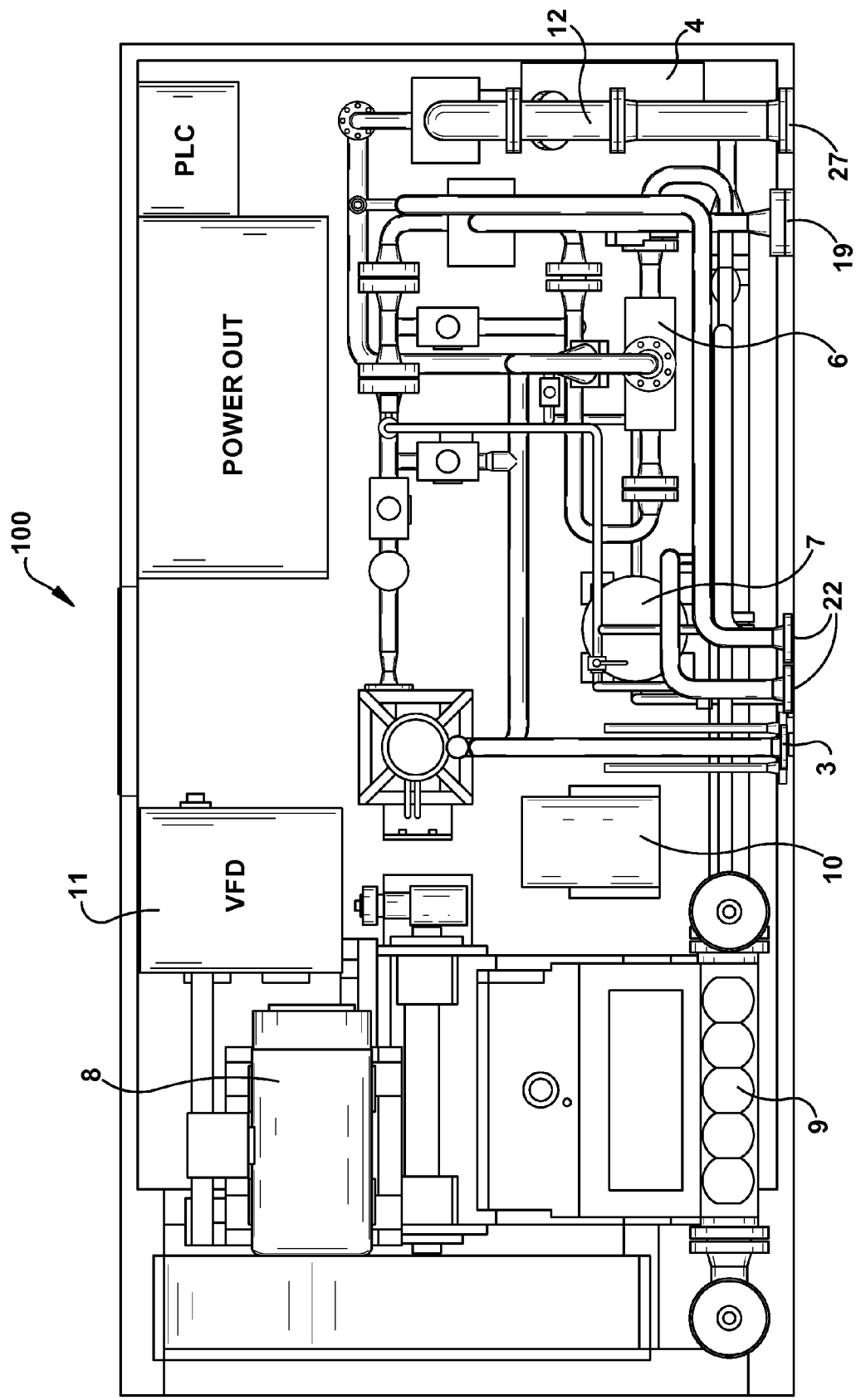

As shown in FIGS. 3A-3M, with continuing reference to FIGS. 1A-1D, the waste heat recovery system of the disclosure may be constructed in one form with the primary components described and some or all of which may be arranged on a single skid or platform or in a containment or protective enclosure, collectively referred to herein as a "skid" or "support structure". FIGS. 3A-3M illustrate a representative embodiment of the inventive heat engine 100 with exemplary dimensions, port locations, and access panels. Some of the advantages of the skid type packaging of the inventive heat engine 100 include general portability and installation access at waste heat sources, protection of components by the external housing, access for repair and maintenance, and ease of connection to the inventive heat engine 100 energy output, to a grid, or to any other sink or consumer of energy produced by the inventive heat engine 100. As shown in FIGS. 3A-3M, the heat engine 100 is constructed upon a frame having the representative and exemplary dimensions, and within a housing on the frame. Access and connection points are provided external to the housing as indicated, in order to facilitate installation, operation and maintenance. FIGS. 3B-3E indicate the various operative connections to the inventive heat engine 100 including the waste heat source supply 19, cooling water supply, and water heat source and cooling water return lines (FIG. 3B); instrument air supply 29 and a mass management (working fluid) fill point 21 (FIG. 3C); expander 3 air outlet and pressure relief valves exhaust 22 (FIG. 3D); and $CO_2$ pump vent 30, high pressure side vent 23, and additional pressure relief valve exhaust (FIG. 3E). Adequate ventilation, cooling via radiators 4 as required and sound-proofing is also accommodated by the housing design. The principle components of the system are indicated on FIG. 3M and illustrated pipe connections. The variable frequency drive (VFD) 11, programmable logic controller (PLC) and electrical power panel (Power Out) are schematically illustrated as installed within the housing.

Also included on or off the skid, or otherwise in fluid or thermal communication with the working fluid circuit of the system, is at least one waste heat exchanger (WHE) 5 (also shown in FIG. 1A). The WHE uses a heat transfer fluid (such as may be provided by any suitable working fluid or gas, such as for example Therminol XP), which is ported to the WHE 5 from an off-skid thermal source, through the exterior of the skid enclosure through a waste heat source supply port 19, through the WHE 5 circuit to a waste heat source return 20 exiting the housing (FIGS. 3A-3E). In the preferred embodiment, heat is transferred to the system working fluid in the waste heat exchanger 5. The working fluid flow and pressure entering the expander EXP 3 may be controlled by the start, shutoff and bypass valves and by the control system provided herein. Also provided is a cooler 12, where additional residual heat within the working fluid is extracted from the system, increasing the density of the working fluid, and exits the cooler 12 and into the System Pump 9. The cooler 12 may be located on or off the skid.

Supercritical working fluid exits the pump 9 and flows to the recuperator (REC) 6, where it is preheated by residual heat from the low pressure working fluid. The working fluid then travels to the waste heat exchanger (WHE) 5. From WHE 5, the working fluid travels to the expander (EXP) 3. On the downstream side of the EXP 3, the working fluid is contained in a low pressure side of the cycle. From the EXP 3 the working fluid travels through the REC 6, then to the cooler 12 and then back to the Pump 9.

Suitable pressure and temperature monitoring at points along the lines and at the components is provided and may be integrated with an automated control system.

A control system can be provided in operative connection with the inventive heat engine system 100 to monitor and control the described operating parameters, including but not limited to: temperatures, pressures (including port, line and device internal pressures), flow metering and rates, port control, pump operation via the VFD, fluid levels, fluid density leak detection, valve status, filter status, vent status, energy conversion efficiency, energy output, instrumentation, monitoring and adjustment of operating parameters, alarms and shut-offs.

As further described, a representative control system may include a suitably configured programmable logic controller (PLC) with inputs from the described devices, components and sensors and output for control of the operating parameters. The control system may be integral with and mounted directly to the inventive heat engine 100 or remote, or as part of distributed control system and integrated with other control systems such as for an electrical supply grid. The control system is programmable to set, control or change any of the various operating parameters depending upon the desired performance of the system. Operating instrumentation display may be provided as a composite dashboard screen display of the control system, presenting textual and graphic data, and a virtual display of the inventive heat engine 100 and overall and specific status. The control system may further include capture and storage of heat engine 100 operational history and ranges of all parameters, with query function and report generation.

A control system and control logic for a 250 kW nominally net power rated Thermafficient Heat Engine 100 of the disclosure may include the following features, functions and operation: automated unmanned operation under a dedicated control system; local and remote human machine interface capability for data access, data acquisition, unit health monitoring and operation; controlled start-up, operation and shut down in the case of a loss of electrical incoming supply power or power export connection; fully automated start/stop, alarm, shut down, process adjustment, ambient temperature adjustment, data acquisition and synchronization; a controls/power management system designed for interfacing with an external distributed plant control system.

Figure 4A:
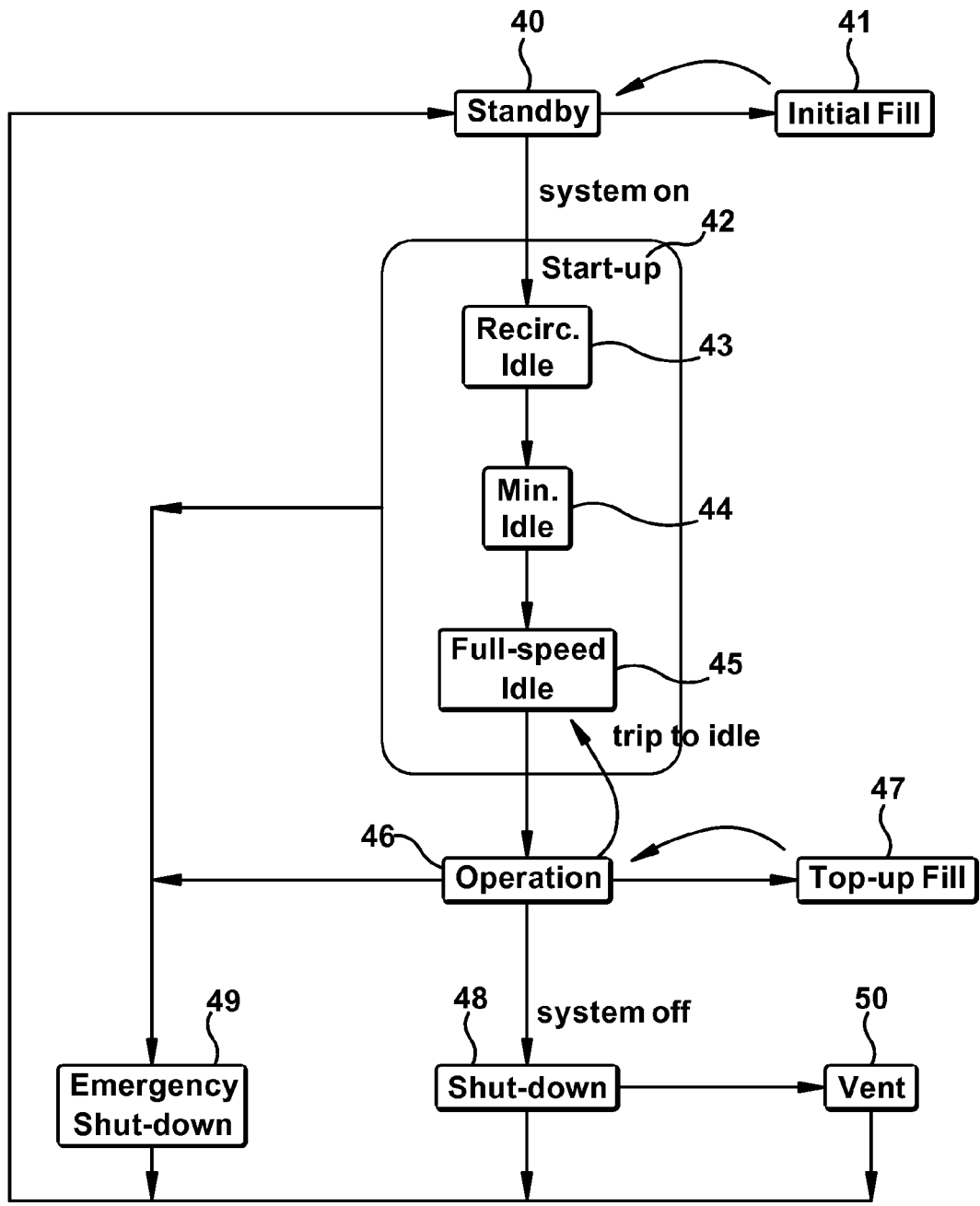
FIG. 4A is a flow chart of operational states of a heat engine of the disclosure.
Figure 4B:
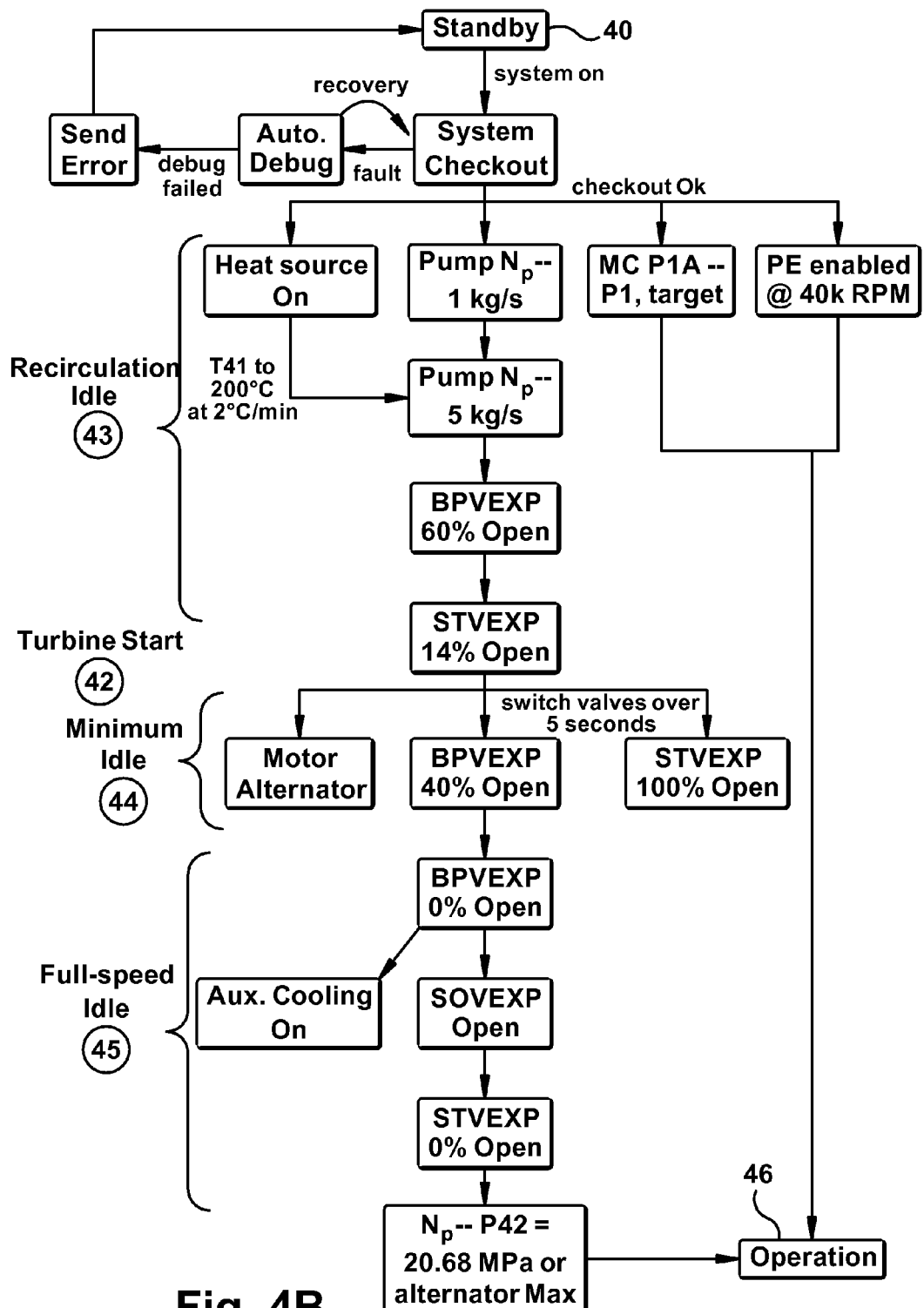
FIG. 4B is a flow chart representing a representative start-up and operation sequence for a heat engine of the disclosure.

An exemplary control system for the thermafficient heat engine 100 may have multiple control states as depicted in FIG. 4A, including the following steps and functions. Initial fill of a working fluid at 41 to purge and fill an empty system allowing system to warm for startup. Top-up fill at 47 to add mass to the mass management tank(s) while the system is in operation. Standby at 40 for power up of sensors and controller; no fluid circulation; and warm-up systems active if necessary. Startup at 42. Recirculation idle at 43 with fluid circulation with turbine in bypass mode; gradually warming up recuperator, cooling down waste heat exchanger; BPVWHX initially open, but closes as hot slug is expelled from waste heat exchanger. Minimum idle at 44, with turbine at minimum speed (.about.20 k RPM) to achieve bearing lift-off; Turbine speed maintained (closed-loop) through a combination of pump speed and valve 24 position. Full speed idle at 45, with turbine at design speed (40 k RPM) with no load; Pump speed sets turbine speed (closed-loop). Operation at 46, with turbine operating at design speed and produced nominal design power; switch to load control from pump speed control by ramping up pump speed while using power electronics 1 load to maintain turbine speed at 40 k RPM. Shutdown at 48, with controlled stop of the turboexpander 3 and gradual cooling of the system. An emergency shutdown at 49, for unexpected system shutdown; the pump 9 and turboexpander 3 brought down quickly and heat exchangers allowed to cool passively, and venting at 50 to drain the system and remove pressure for maintenance activities.

Figure 4C:
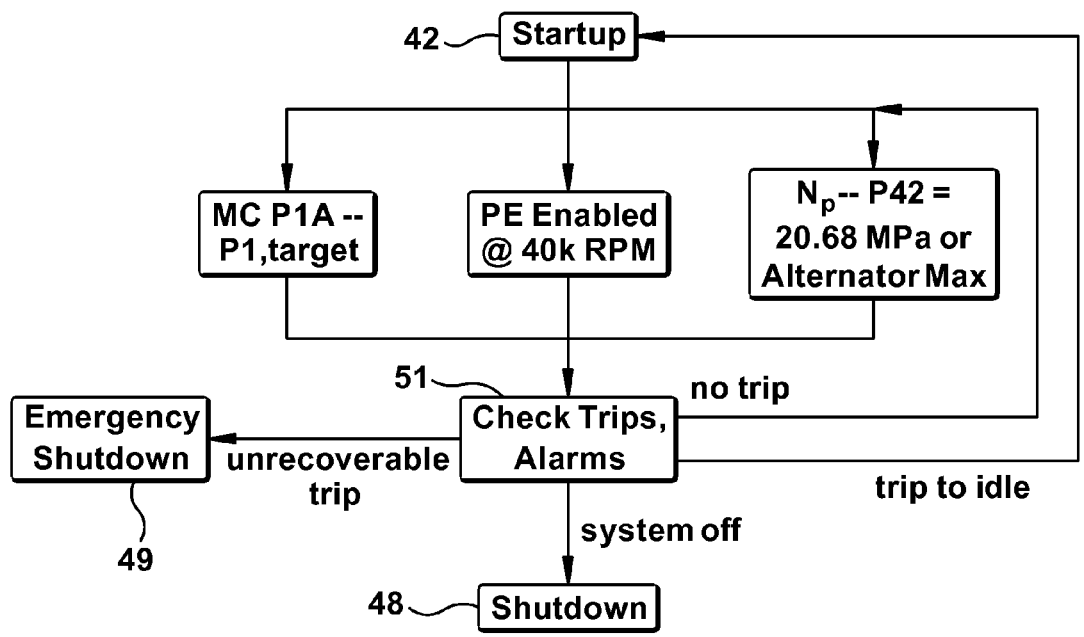
FIG. 4C is a flow chart representing a shut-down sequence for a heat engine of the disclosure.

As represented in FIG. 4C, other functions of the control system may include an check trips and alarms 51, with control links to shutdown 48 and emergency shutdown 49, startup 42, and continued operation with a recoverable alarm state.

The invention thus disclosed in sufficient particularity as to enabling an understanding by those of skill in the art, the following claims encompassing all of the concepts, principles and embodiments thus described, and all equivalents.

What is claimed is:

1. A heat engine system operative to execute a thermodynamic cycle comprising:
    a working fluid circuit having a high pressure side and a low pressure side, and a working fluid circulated within the working fluid circuit;
    a heat exchanger arranged in the working fluid circuit and in thermal communication with a heat source whereby thermal energy is transferred from the heat source to the working fluid;
    an expander arranged in the working fluid circuit in fluid communication with the heat exchanger and located between the high pressure side and the low pressure side of the working fluid circuit, the expander being operative to convert a pressure drop in the working fluid to mechanical energy;
    a recuperator arranged in the working fluid circuit in fluid communication with the expander and operative to transfer thermal energy between the high pressure side and the low pressure side of the working fluid circuit;
    a cooler fluidly coupled to the recuperator and in thermal communication with the low pressure side of the working fluid circuit, the cooler being operative to control a temperature of the working fluid in the low pressure side of the working fluid circuit;
    a pump arranged in the working fluid circuit and fluidly connected between the low pressure side and the high pressure side of the working fluid circuit, the pump being operative to circulate the working fluid through the working fluid circuit;
    a mass management system having a working fluid vessel fluidly connected to the low and high pressure sides of the working fluid circuit via one or more valves, the one or more valves being moveable to either remove working fluid from the working fluid circuit or add working fluid to the working fluid circuit; and
    a control system operatively connected to the working fluid circuit and the mass management system to control and monitor operating parameters of the heat engine system, the control system being operable to manipulate the one or more valves in order to regulate working fluid circuit temperature and pressure.

2. The heat engine system of claim 1 wherein the expander comprises a turbine.

3. The heat engine system of claim 1 wherein the expander comprises a positive displacement device.

4. The heat engine system of claim 1 further comprising a power generator coupled to the expander.

5. The heat engine system of claim 4 wherein the power generator is magnetically coupled to the expander.

6. The heat engine system of claim 1, wherein the mass management system is connected to the low pressure side of the working fluid circuit proximate an inlet to the pump.

7. The heat engine system of claim 2, wherein a portion of the working fluid in the high pressure side is extracted and used as a coolant for the expander, a pressure of the portion of the working fluid being substantially matched to a pressure of the working fluid at an inlet to the expander.

8. The heat engine system of claim 1 wherein the pump is a positive displacement pump operative to increase pressure of the working fluid in the high pressure side of the working fluid circuit.

9. The heat engine system of claim 1, wherein the mass management system further comprises a fill port wherein additional working fluid is added to the working fluid vessel from an external source.

10. The heat engine system of claim 1, wherein the mass management system further comprises a heat exchanger coil for controlling a temperature of the working fluid in the working fluid vessel.

11. The heat engine system of claim 1 wherein the working fluid is carbon dioxide.

12. The heat engine system of claim 1, wherein the heat source is a waste heat source.

13. The heat engine system of claim 1, further comprising:
an alternator operatively coupled to the expander; and
power electronics operatively coupled to the alternator.

14. The heat engine system of 13, further comprising a cooling system that thermally manages the alternator and power electronics.

15. The heat engine system of claim 1, further comprising one or more sensors arranged in the working fluid circuit to monitor working fluid temperature and pressure.

16. The heat engine system of claim 15, wherein the control system is operatively coupled to the one or sensors.

17. A power generation device for converting thermal energy into mechanical energy, comprising:
a working fluid circuit having a high pressure side and a low pressure side and a working fluid circulating within the working fluid circuit, the working fluid circuit comprising:
a heat exchanger in thermal communication with a waste heat source to transfer thermal energy to the working fluid;
an expander in fluid communication with the heat exchanger and fluidly arranged between the high and low pressure sides of the working fluid circuit, the expander being configured to convert a pressure drop in the working fluid to mechanical energy;
a cooler in fluid communication with the expander and configured to regulate a temperature of the working fluid in the low pressure side; and
a pump fluidly coupled to the cooler and configured to pressurize and circulate the working fluid through the working fluid circuit;
a mass management system having a mass control tank fluidly coupled to the high pressure side of the working fluid circuit via at least first and second valves and fluidly coupled to the low pressure side of the working fluid circuit via at least a third valve;
an alternator operatively coupled to the expander to convert mechanical energy into electrical energy;
a motor operatively coupled to the pump to drive the pump; and
a variable frequency drive operatively coupled to the motor and configured to regulate a speed of the motor to regulate pump speed.

18. The power generation device of claim 17, wherein the working fluid circuit further comprises a recuperator fluidly coupled to the expander and configured to transfer thermal energy between the high pressure side and the low pressure side of the working fluid circuit.

19. The power generation device of claim 17, further comprising a cooling system having a radiator fluidly coupled to the alternator, the cooling system being configured to regulate a temperature of the alternator and accompanying power electronics communicably coupled to the alternator.

* * * * *